E. W. BEEBE.
SPECTACLES.
APPLICATION FILED SEPT. 30, 1908.
945,078.
Patented Jan. 4, 1910.
2 SHEETS—SHEET 1.
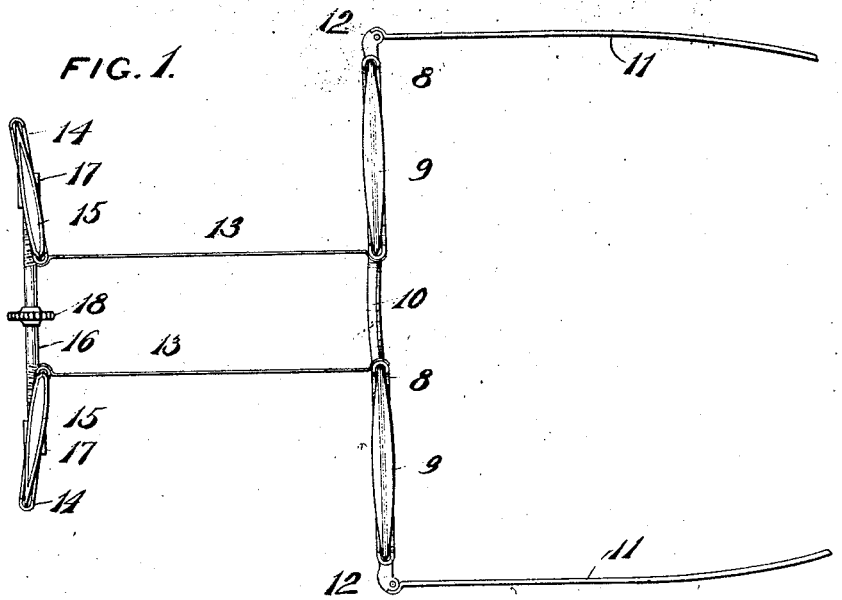
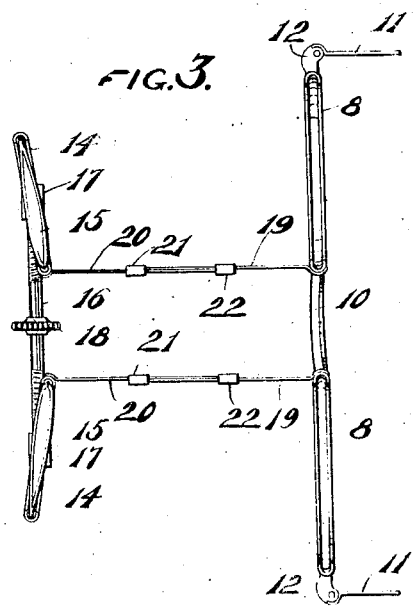
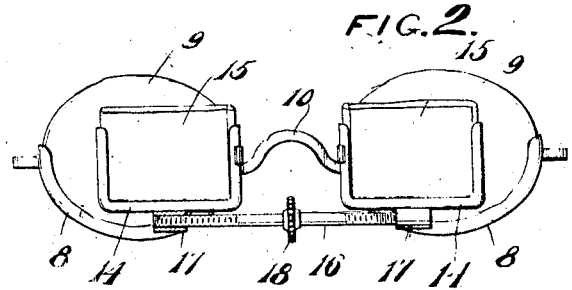
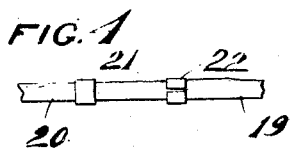
WITNESSES.
INVENTOR.
Eugene W. Beebe
By Benedict, Morsell & Caldwell
ATTORNEYS.

E. W. BEEBE.
SPECTACLES.
APPLICATION FILED SEPT. 30, 1908.
945,078.
Patented Jan. 4, 1910.
2 SHEETS—SHEET 2.
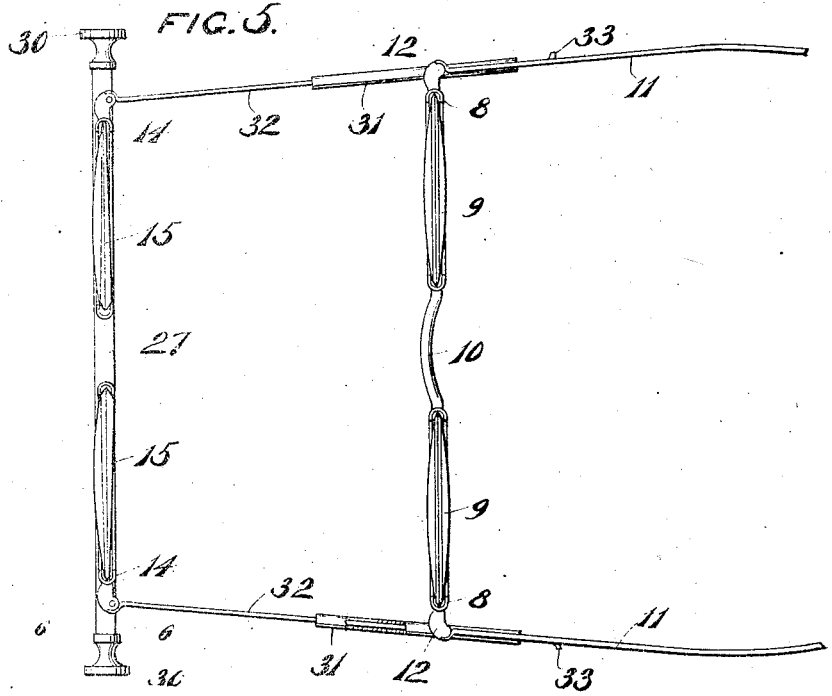
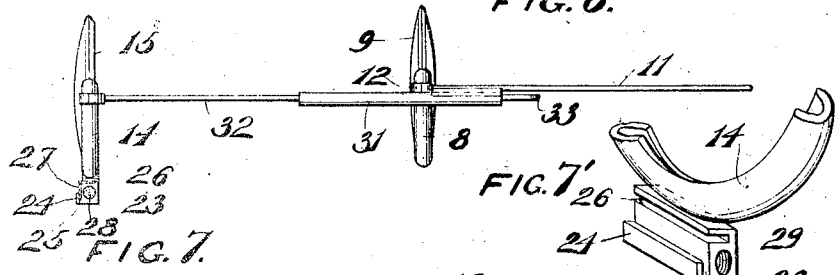
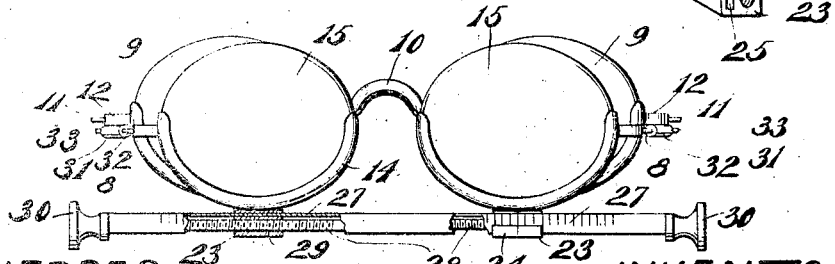
WITNESSES.
INVENTOR.
Eugene W. Beebe.
By Benedict, Morsell & Caldwell
ATTORNEYS.

UNITED STATES PATENT OFFICE.

EUGENE W. BEEBE, OF MILWAUKEE, WISCONSIN.

SPECTACLES.

945,078. Specification of Letters Patent. Patented Jan. 4, 1910.

Application filed September 30, 1908. Serial No. 455,460.

*To all whom it may concern:*

Be it known that I, EUGENE W. BEEBE, residing in Milwaukee, in the county of Milwaukee, and State of Wisconsin, have invented new and useful Improvements in Spectacles, of which the following is a description, reference being had to the accompanying drawings, which are a part of this specification.

My invention has relation to improvements in spectacles.

One of the primary objects of the invention is to provide a form of spectacles wherein two complete frames are combined in one structure, and arranged one in advance of the other, the front frame adapted to contain lenses suitable for magnifying objects, and the rear frame adapted to contain, if desired, lenses suitable for particular defects in the eyes.

A further object is to provide a means for adjusting laterally the magnifying lenses so as to suit eyes of different persons.

A further object is to provide for longitudinal adjustment, so as to adjust the distance of the front lenses from the eyes, in order to regulate the magnifying lenses with relation to the eyes.

With the above primary, and other incidental, objects in view, the invention consists of the devices and parts, or their equivalents, as hereinafter set forth.

In the accompanying drawings, Figure 1 is a plan view of one form of the invention; Fig. 2 is a front view of Fig. 1; Fig. 3 is a plan view of a modified form in which the connecting arms are longitudinally adjustable, the rearward lenses being omitted; Fig. 4 is a detail view of the longitudinally adjustable feature of the form of construction shown in Fig. 3; Fig. 5 is a plan view of another modified form of construction; Fig. 6 is a cross section on the line 6—6 of Fig. 5; Fig. 7 is a front view of Fig. 5, parts broken away; and Fig. 7' is a perspective view of the mechanism for securing lateral adjustment of the forward lenses, in the form of Fig. 5.

Referring to the several figures of the drawings, the numerals 8, 8 indicate the rear rims or bows for containing the rear glasses or lenses 9, 9, 10 the connecting bridge therefor, and 11, 11 the side bars for clasping the head of the wearer. In the form of construction shown by Figs. 1 and 2 the side bars are pivoted to the pivot lugs 12, 12 extending outwardly from the bows.

In all of the figures of the drawings, with the exception of Fig. 3, the lenses or glasses 9 are shown as arranged within the bows, while in said Fig. 3 the said lenses or glasses are omitted.

Extending forwardly from the inner ends of the bows 8 (Fig. 1 construction) are spring arms 13, 13. The outer ends of these spring arms are connected to the inner ends of the forward bows 14, 14. These bows contain magnifying lenses or glasses 15, 15, and are set at an angle, so as to necessarily dispose the lenses at an angle in order to make it possible for the wearer to look straighter at an object than if the lenses were straight, in view of the fact that the distance between the lenses is less or narrower than the distance between the eyes. The lenses 15 are preferably prismatic lenses, that is to say, they are thicker at the inner edge than at the outer edge thereof, and by reason of this particular formation it is possible to converge or bring the angle of vision of both lenses close together to better advantage, without the necessity of bringing them too close together. Too close an adjustment of the lenses together is objectionable in the case of many people.

In order to provide for lateral adjustment of the lenses 15, in order to suit different eyes, I provide an adjusting mechanism consisting of a rod 16 having its opposite ends oppositely threaded, and engaging the oppositely threaded nuts 17, 17 rigid with and depending from the bows 14. For convenience in turning the rod 16, the central plane portion thereof has rigidly mounted or formed thereon a small disk or wheel 18. It is obvious that the bows 14 may be brought closer together or farther apart by turning the disk or wheel 18 in the proper direction, and thereby the distance apart laterally of the glasses 15 is readily regulated. By reason of the fact that the arms 13 are spring arms, the lateral adjustment just referred to is not interfered with.

The form of construction shown in Figs. 3 and 4 is similar in all respects to the Figs. 1 and 2 form, excepting that each arm 13 instead of being a continuous or unbroken arm, is made up of two sections 19 and 20, telescopically fitted together. The telescoping fit is secured by providing the arm section 19 at its forward end with the sleeve 21 through which the arm 20 freely passes, and by providing the rear end of arm section 20 with a sleeve 22 through which arm section 19 freely passes. By this construction, the front lenses are made longitudinally adjustable, that is to say, the distance of said lenses from the rear frame of the spectacles may be either increased or diminished. This longitudinal adjustment is designed to regulate the front magnifying lenses 15, with relation to the eyes in order to get the best magnifying effect. If the magnifying lenses 15 were as close to the eyes as ordinary spectacles would bring such lenses, it would be necessary, in order to obtain the magnifying effect, to bring the object under examination close to the eyes. By my improved construction this is entirely obviated. In further explanation of the advantages of the invention, it might be stated that, under ordinary conditions, as for instance in the use of a watch maker's lens, the magnifying effect is only obtained from one eye at a time, whereas in my construction binocular vision is obtained, and this by reason of the regulation of the pupillary distance of the lenses.

In the use of my invention, the rear lenses 9 may or may not be used, as circumstances require. If the user has defective eyes, as for instance, near sightedness, far sightedness, or astigmatism and ordinarily uses a certain character of lens for correcting the particular defect, such lenses are adjusted to the rear bows. On the other hand, if a person's sight is not defective and it is not therefore necessary for him to use eye glasses, the rear lenses are omitted altogether. In other words, the object is to provide the front lenses for magnifying objects, and when the rear lenses are used, to employ lenses which are suitable for particular defects in the eyes. Indeed, a person could leave the glasses he ordinarily uses adjusted to the nose, and then bring the rear frame, with the lenses thereof omitted, in proper position in front of said glasses. It will be further noted that in my invention the lenses are small and do not interfere with the vision, so that the user can look around freely and do all kinds of work without the glasses interfering, or without the necessity of removing the glasses from the face, in view of the fact that it is possible to look over, under, or at the sides of the glasses. The construction will be found particularly useful in engravers' work, for the removal of superfluous hair lines and also in watch-makers' work.

Sheet 2 shows a construction wherein a different specific means is provided for securing the lateral adjustment, and also a different specific means for securing the longitudinal adjustment over what is shown on Sheet 1 of the drawings. Referring first to the modified form of the laterally adjustable mechanism, particular reference being made to Figs. 7 and 7' it will be seen that the rear bows are provided with rigid depending nuts 23, 23. The front side of each nut is provided with an upwardly extending lug 24 forming a recess 25 between its rear side and the front of the nut. The upper portion of each nut is formed with an inwardly extending recess 26. An angular guide plate 27 has its lower end fitting in the recess 25 and its upper inwardly bent portion extending into and fitting the recess 26 serves as a guide for the nuts and also to position a rod 28 passing through the threaded openings 29 of the nuts. The outer ends of said rod have rigidly mounted thereon heads or finger pieces 30, 30, and the inner ends of said heads or finger pieces bearing against the outer ends of the angular guide 27. The rod is formed with opposite threads which respectively engage the threaded openings of the nuts. It is obvious that when the rod 28 is turned by grasping one of the finger pieces 30, the threads of the rod act on the threads of the nuts, and as the rod cannot move longitudinally, the nuts are caused to be moved along the guide 27, the said guide being stationary. If the rod is turned in one direction, the bows will be brought toward each other, or closer together, while if the rod is turned in the opposite direction, the bows will be moved away from each other, or farther apart, the spring arms which connect the rear frame with the front frame permitting this movement. Relative to the modified form of mechanism for securing longitudinal adjustment shown on Sheet 2, the end lugs 12, 12 of the rear bows 8 have rigidly secured therebeneath tubes 31, 31. Through these tubes freely pass spring arms 32, 32, the forward ends of said spring arms being connected to the outer ends of the front bows 14. The rear end of each spring arm 32 is upturned, as indicated by the numeral 33, to form a stop to limit the extent of the forward adjustment of the front frame. The rear side bars 11 are secured to the upper portions of the tubes 31. If desired, scales, shown clearly in Fig. 7, may be provided, so that a user after once obtaining a proper lateral adjustment to suit his particular case, can always thereafter set the glasses at this particular point.

What I claim as my invention is:

1. A double binocular spectacle, comprising a frame consisting of a bridge and bows connected thereto and fitted with lenses adapted to correct defects in the vision of the wearer, arms extending forwardly from the medial portion of the frame, and bows connected together and fastened to the outer ends of the arms and fitted with magnifying lenses adapted to coöperate with the lenses of the frame and form compound lenses.

2. A double binocular spectacle, comprising a frame consisting of a bridge and bows connected thereto and fitted with lenses adapted to correct defects in the vision of the wearer, arms extending forwardly from the medial portion of the frame, and bows adjustably connected together and fastened to the outer ends of the arms and fitted with magnifying lenses adapted to coöperate with the lenses of the frame and form compound lenses, the outer lenses being positioned at an angle with relation to the lenses of the frame.

3. A double binocular spectacle, comprising a frame consisting of a bridge and bows connected thereto and fitted with lenses adapted to correct defects in the vision of the wearer, yielding longitudinally adjustable arms extending forwardly from the medial portion of the frame, bows connected to the outer ends of the arms and fitted with magnifying lenses adapted to coöperate with the lenses of the frame and form compound lenses, and means for adjusting the bows connected to the arms.

4. A double binocular spectacle, comprising a frame consisting of a bridge and bows connected thereto and fitted with lenses, yielding arms extending forwardly from the frame, bows connected together and fastened to the outer ends of the arms and fitted with lenses, and a right and left handed screw for adjusting the outer bows a greater or less distance apart.

5. A double binocular spectacle, comprising a frame consisting of a bridge and bows connected thereto and fitted with lenses, yielding longitudinally adjustable arms extending forwardly from the frame, bows connected to the outer ends of said arms, nuts depending from said bows and provided with grooves positioned at an angle with relation to each other, a turnable rod threaded to said nuts and provided with shouldered ends, and a member engaging the grooves of the nuts and bearing against the shoulders of the rod.

6. A double binocular spectacle, comprising a frame consisting of a bridge and bows connected thereto and fitted with lenses, yielding longitudinally adjustable arms extending forwardly from the frame, bows connected to the outer ends of said arms, nuts depending from said bows and provided with right angle grooves, a right and left handed threaded rod mounted in said nuts and provided with shouldered ends, and an angle bar engaging said grooves and bearing against the shoulders of the rod.

7. In double binocular spectacles, the combination of a lens holding frame adapted to be adjusted to the nose of a person, spring arms extending forwardly from the frame, bows connected together and fastened to the forward ends of the longitudinally adjustable arms, lenses removably fitted to said bows, and means for adjusting the bows, and consequently the lenses carried thereby, closer together or farther apart.

8. In double binocular spectacles, the combination of a frame adapted to be adjusted to the nose of a person, arms extending forwardly from the frame, each arm composed of two sections, the rear section of each arm having its forward end provided with a sleeve through which the forward section freely passes, and the rear end of each forward section provided with a sleeve through which the rear section freely passes, bows adjustably connected together and carried at the forward ends of the forward sections of the arms, and lenses carried by said bows.

9. In double binocular spectacles, the combination of a frame comprising bows and a connecting bridge, said bows constructed to have lenses fitted thereto, longitudinally adjustable spring arms extending forwardly from the bows, other bows connected to the forward ends of said arms, means for adjusting said other bows closer together or farther apart, and lenses fitted to said last mentioned bows.

In testimony whereof, I affix my signature, in presence of two witnesses.

EUGENE W. BEEBE.

Witnesses:
A. L. MORSELL,
ALMA A. KLUG.